No. 688,151. Patented Dec. 3, 1901.
D. C. ADAMS.
SAW SET.
(Application filed Aug. 5, 1901.)
(No Model.)
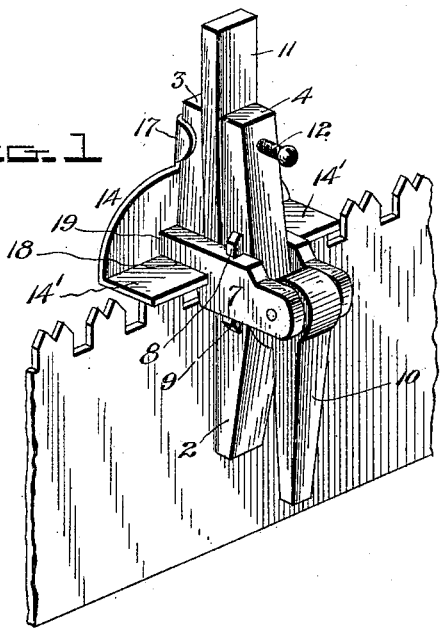
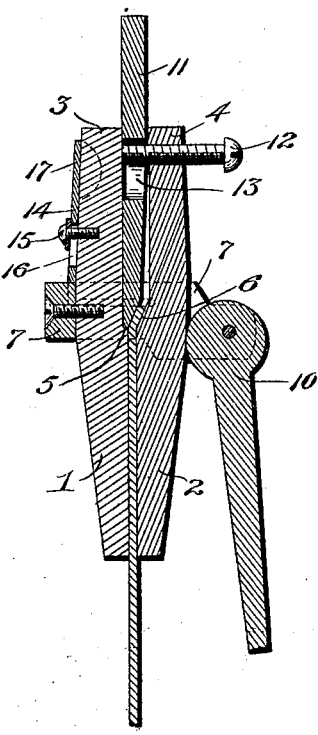
Witnesses
J. A. Griesbauer, Jr.
G. A. Willson
Inventor
D. C. Adams
By H. B. Willson & Co.
Attorneys
THE NORRIS PETERS CO., PHOTO-LITHO., WASHINGTON, D. C.

UNITED STATES PATENT OFFICE.

DELMER C. ADAMS, OF PAINESVILLE, OHIO.

SAW-SET.

SPECIFICATION forming part of Letters Patent No. 688,151, dated December 3, 1901.

Application filed August 5, 1901. Serial No. 70,964. (No model.)

*To all whom it may concern:*

Be it known that I, DELMER C. ADAMS, a citizen of the United States, residing at Painesville, in the county of Lake and State of Ohio, have invented certain new and useful Improvements in Saw-Sets; and I do declare the following to be a full, clear, and exact description of the invention, such as will enable others skilled in the art to which it appertains to make and use the same.

The invention relates to saw-sets for expeditiously and uniformly setting the teeth of crosscut-saws, drag-saws, and circular crosscut-saws.

Serious objections have been urged against saw-sets now in general use in that the teeth are not set with that degree of uniformity necessary to obtain the best results of the saw when in use, and the failure to obtain this uniform setting of the teeth is chiefly attributable to the fact that in giving the proper pitch or set to the end of the tooth the body of the tooth, as well as the plate of the saw contiguous to the body of the tooth, has not been properly supported to prevent springing. It is therefore evident that although the operator could with precision regulate the bend or set of the tooth he could not check or prevent the springing of the body of the tooth or the saw-plate, and hence after the saw-teeth were set, owing to the springing of the bodies of some of the teeth and the plate, the ends of the teeth would be distorted from the true lines of setting, and thus lessen the effectiveness of the saw.

The object of the present invention is to provide a saw-set which shall be simple of construction, durable in use, comparatively inexpensive of production, and which will entirely overcome the objections above noted by permitting of the saw-teeth being uniformly set, provision being made for supporting the body of the saw-tooth being set and also for supporting that portion of the saw-plate contiguous to said body.

With this and other objects in view the invention consists of certain novel features of construction, combination, and arrangement of parts, which will be hereinafter more fully described, and particularly pointed out in the appended claims.

In the accompanying drawings, Figure 1 is a perspective view illustrating my improved saw-set in use, and Fig. 2 is a longitudinal vertical sectional view taken through the parts when in the position shown in Fig. 1.

In the drawings, 1 and 2 denote the jaws of the saw-set, which are adapted to be clamped in place upon a saw-plate, with the tooth of the saw that is to be set located between said jaws, and 3 and 4 denote the shanks of the jaws, which have their inner faces cut away, so that when said jaws 1 and 2 are brought together there will always remain a space between the shanks 3 and 4. The upper end and inner face of the jaw 1 is provided with a transverse stop-shoulder 5, and the upper end and inner face of the jaw 2 is formed with a setting-die 6, preferably in the form of an inclined shoulder, against which the tooth to be set is adapted to be forced.

7 denotes a yoke secured to or cast integral with the jaw 1 and having its ears extended forwardly and embracing the sides of said jaws 1 and 2. The jaw 2 is provided on opposite sides with upper and lower lugs 8 and 9, respectively, which engage the edges of the ears and prevent longitudinal movement of the jaws with respect to each other, but permit of an outward movement of the jaw 2 with respect to the jaw 1. Pivoted between the outer ends of these ears is a cam-lever 10, which is adapted to work against the forward face of the jaw 2 and clamp the saw in position.

11 denotes a punch adapted to reciprocate in the space formed between the shanks 3 and 4 and having its lower end beveled to correspond to the bevel of the die 6. The downward movement of this punch is limited by the stop-shoulder 5.

12 denotes a set-screw which works through the upper end of the shank 4, a longitudinal slot 13 in the punch, and against the inner face of the shank 3, and is designed, in addition to preventing the accidental displacement of the punch, to adjust the jaws with respect to each other to conform to the different thicknesses of saw-plates.

14 denotes a vertically-adjustable saw-gage secured to the rear side of the shank 3 by a set-screw 15, which passes through a slot 16, formed in the back of the gage, and has an upwardly-projecting extension 17, with side flanges to embrace the sides of the shank 3 to prevent the twisting or canting of said gage in its vertical movement, thus positively holding the face 14' of the gage at right angles to the length of the shank. The face of the gage is provided with a slot 18, which communicates with a slot 19, formed in the back of the gage, and these slots embrace the yoke and also serve to prevent the twisting or canting of the gage.

In use the cam-lever is elevated and the jaws separated and placed on opposite sides of a saw-plate, with a saw-tooth to be set extending upwardly and lying at a point to one side of the die 6. The lever is now depressed, which forces the jaws firmly against the body of the tooth and the plate of the saw contiguous to the body of the tooth and leaves the end of the tooth projecting above the shoulder 5 and at one side of the die 6. Now by imparting one or more sharp blows to the punch it will be forced downwardly and will with its beveled end bend that portion of the tooth above the shoulder 5 down upon the die 6, thus giving the proper set to the tooth. In imparting these blows to the punch the body of the tooth and the plate contiguous thereto, owing to the fact that they are firmly clamped between the jaws, will not spring, as heretofore, so that no trouble will be experienced in that direction, thus enabling me to set uniformly the saw-teeth, and thereby obtain better results than would be possible were the body of a tooth and plate of the saw contiguous thereto left unsupported or unsecured against distortion or spring.

In order to avoid confusion, I might say that in speaking of the "body" of a tooth I mean that part of the tooth between the point thereof which is intended to be bent and the saw-plate.

It will be understood that by adjusting the gage-plate greater or less pitch may be given to the teeth and that by adjusting the jaws by the set-screw 12 the saw-set is made to accommodate saw-plates of different thicknesses.

From the foregoing description, taken in connection with the accompanying drawings, the construction and mode of operation of my invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. In a saw-set, the combination with clamping-jaws, the upper ends of which are provided, the one with a stop-shoulder and the other with a beveled die, a yoke connecting the jaws, a cam pivoted between the free ends of the yoke and adapted to clamp the jaws together, of a punch having a beveled lower end adapted to coact with the beveled die, substantially as set forth.

2. In a saw-set, the combination with clamping-jaws, the upper ends of which are provided, the one with a stop-shoulder and the other with a beveled die, a yoke connecting the jaws, a cam pivoted between the free ends of the yoke and adapted to clamp the jaws together, of a punch having a beveled lower end adapted to coact with the beveled die, and an adjustable gage-plate, substantially as set forth.

3. In a saw-set, the combination with clamping-jaws provided with upwardly-extending shanks, a yoke fixed to one of said jaws and embracing the other jaw and connected thereto to permit of the lateral movement of one jaw with respect to the other and prevent a relative vertical or longitudinal movement, a cam-lever journaled between the ears of said yoke and designed to clamp the jaws together, of a punch, and a vertically-adjustable gage-plate, substantially as set forth.

4. In a saw-set, the combination with clamping-jaws terminating at their upper ends in spaced-apart shanks, one of said jaws having on its inner face a beveled die and the other jaw having on its inner face a stop-shoulder, and means for clamping the jaws together against the tool to be set, of a punch free of movement between the shanks and having its lower end beveled to correspond with the bevel of the aforesaid die and formed with a longitudinal slot in its body portion, and a set-screw passed through one of said shanks, the longitudinal slot, and engaging the other shank, and serving the twofold purpose of preventing the accidental displacement of said punch and of regulating the adjustment of said jaws to different thicknesses of saw-plates, substantially as set forth.

5. In a saw-set, the combination with two clamping-jaws having parallel coacting clamping-faces to engage the saw-blade and the body of a tooth on opposite sides thereof, one of said jaws being provided with a die, offset from its parallel face, spaced-apart shanks projecting upwardly from said jaws, one of said shanks being provided with a stop, of a punch mounted to reciprocate freely between said shanks and adapted to bend or set the end of the saw-tooth against said die and be limited in its downward movement by the stop aforesaid, substantially as set forth.

In testimony whereof I have hereunto set my hand in presence of two subscribing witnesses.

DELMER C. ADAMS.

Witnesses:
J. R. ADAMS,
GEO. H. SHEPHERD.